US008886163B2

(12) United States Patent
Albisu

(10) Patent No.: US 8,886,163 B2
(45) Date of Patent: Nov. 11, 2014

(54) SUBSIDIZING DATA USAGE IN MOBILE WIRELESS NETWORKS

(75) Inventor: Luis Francisco Albisu, Fairfax Station, VA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 128 days.

(21) Appl. No.: 13/549,852

(22) Filed: Jul. 16, 2012

(65) Prior Publication Data
US 2014/0018035 A1    Jan. 16, 2014

(51) Int. Cl.
*H04M 11/00* (2006.01)
(52) U.S. Cl.
USPC ........ 455/406; 455/405; 455/414.1; 455/418; 455/422.1
(58) Field of Classification Search
CPC .... H04W 4/24; H04M 2215/26; H04M 15/00
USPC .................... 455/406, 405, 414.1, 418, 422.1
See application file for complete search history.

(56) References Cited

U.S. PATENT DOCUMENTS

| 2007/0150388 | A1* | 6/2007 | Mendiratta et al. ............. 705/35 |
| 2010/0197268 | A1 | 8/2010 | Raleigh |
| 2010/0223096 | A1 | 9/2010 | Bosan et al. |

OTHER PUBLICATIONS

Troianovski, A., "AT&T May Try Billing App Makers," [http://online.wsj.com/article/SB10001424052970204653604577249080966030276.html] Feb. 28, 2012.

* cited by examiner

*Primary Examiner* — Nghi H Ly
(74) *Attorney, Agent, or Firm* — Hartman & Citrin LLC

(57) ABSTRACT

Concepts and technologies disclosed herein are for subsidizing data usage in a mobile wireless network. A method for subsidizing data usage may include monitoring data traffic traversing the mobile wireless network, determining if the data traffic is directed to a unique uniform resource locator that is associated with a computing resource that data directed thereto is to be subsidized, and recording data usage for the data traffic and providing the data usage to a charging system of the mobile wireless network in response to determining that the data traffic is directed to the unique uniform resource locator.

18 Claims, 8 Drawing Sheets

SUBSIDIZING DATA USAGE IN MOBILE WIRELESS NETWORKS

TECHNICAL FIELD

The concepts and technologies disclosed herein generally relate to charging and billing in mobile wireless networks. More specifically, the concepts and technologies disclosed herein relate to subsidizing data usage in mobile wireless networks.

BACKGROUND

Mobile wireless telecommunications services are typically provided to customers via a prepaid account or a postpaid account. Postpaid accounts are designed so that the postpaid customer is billed at the end of a billing cycle for services rendered in excess of a service plan. Often times, the customer is unaware of the overage and is billed an unexpected amount at the end of the billing cycle.

Services such as AT&T's Rollover® service aim to eliminate overages by accumulating unused minutes at the end of each billing cycle for use in future billing cycles. For example, if a customer uses 900 minutes of a 1000 minute service plan during a billing cycle, the remaining 100 unused minutes are added to the customer's total available Rollover® minutes. If the customer exceeds the 1000 minute limit during a future billing cycle, the customer's Rollover® account is debited the overage amount of minutes instead of the customer being charged overage fees for the excess minutes. Minutes in a customer's Rollover® account are typically set to expire after a predetermined time, such as every year.

Prepaid customers typically purchase a credit for a predetermined number of voice minutes or data blocks (often offered in increments of megabytes or gigabytes) prior to receiving voice or data service. By purchasing credit in advance of use on a mobile wireless network, a customer can access voice or data services without contractual obligation and a re-occurring bill, as is the case with many postpaid service plans. A customer may then use the voice or data service until the expiration of the prepaid credit.

While features such as Rollover® provide incentive for potential customers to select one mobile wireless service provider over another, the transition of the mobile wireless service industry from providing voice and data services to providing predominately data-based services, including Voice over Internet Protocol ("VoIP") via Long-Term Evolution ("LTE") for example, will eventually render the concept of voice minutes obsolete in favor of data-centric service plans. Moreover, the integration in many mobile devices of operating system level and application level features that rely upon a data connection contributes to the need for greater data usage by customers. Many of these features are provided via a cloud computing model, by which software and other computing resources are stored, managed, and/or processed on remote computers that are often collectively referred to as "the cloud." As a result of the mobile wireless service industry's transition to predominately data-based services, and the simultaneous and contributory transition of the computing industry to the cloud computing model, mobile wireless service providers may desire to investigate ways to reduce costs while maintaining quality of service and customer costs in this new data-centric landscape.

SUMMARY

Concepts and technologies disclosed herein are for subsidizing data usage in a mobile wireless network. According to one aspect disclosed herein, a method for subsidizing data usage may include monitoring data traffic traversing a mobile wireless network, determining if the data traffic is directed to a unique uniform resource locator ("URL") that is associated with a computing resource that data directed thereto is to be subsidized, and recording data usage for the data traffic and providing the data usage to a charging system of the mobile wireless network in response to determining that the data traffic is directed to the unique URL.

In some embodiments, the data usage is provided to the charging system along with instructions to subsidize the data usage according to a data subsidization agreement between a mobile wireless network provider that provides the mobile wireless network and a computing resource provider that provides a service that utilizes the computing resource.

In some embodiments, the method also includes applying, at the charging system, a data usage credit to a customer account associated with the data usage in accordance with a data subsidization agreement. In some embodiments, the data usage credit includes a monetary value credit that is to be applied to the customer account to subsidize at least a portion of the data usage. In some other embodiments, the data usage credit includes a data block credit that is to be applied to the customer account to subsidize at least a portion of the data usage. In some embodiments, the method also includes providing, at the charging system, a total data usage that may be used to reflect the data usage credit to a billing system.

In some embodiments, the method also includes receiving, at the charging system, an instruction to apply a data usage credit to a customer account. In some embodiments, the instruction is generated based upon a discount code that indicates an amount for the data usage credit.

In some embodiments, the method also includes receiving a request to provision a cloud computing service that utilizes the computing resource for a data subsidization feature to subsidize data directed to the unique URL. In some embodiments, the method also includes storing the unique URL.

In some embodiments, at least a portion of the data traffic is received from a computing device that is configured to execute an application that includes the unique URL to access the computing resource.

It should be appreciated that the above-described subject matter may be implemented, for example, as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
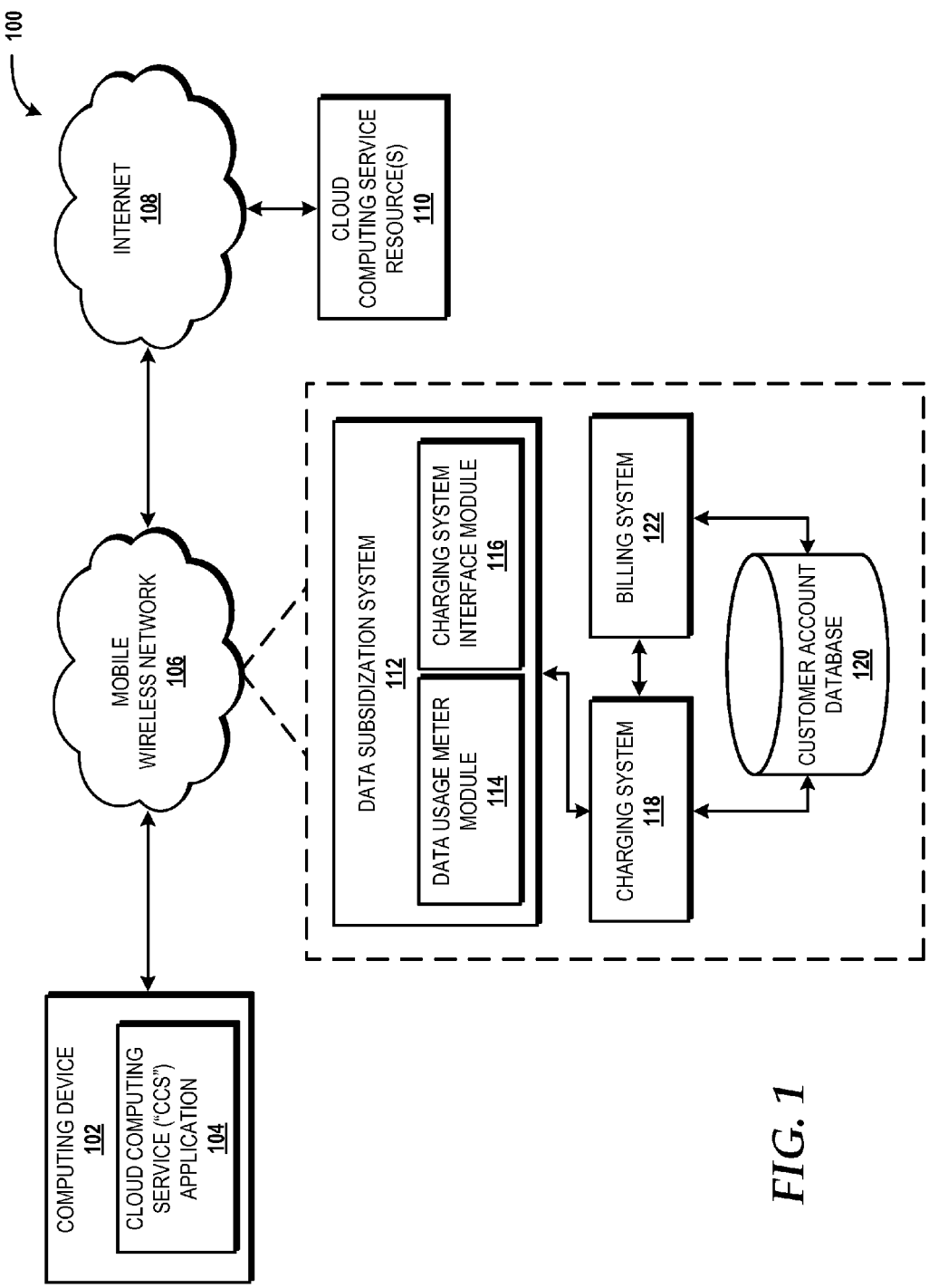
FIG. 1 is a diagram illustrating an illustrative operating environment for implementing various embodiments presented herein.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, mobile devices, wireless devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodologies, among others, for subsidizing data usage in a mobile wireless network will be presented.

Referring now to FIG. 1, aspects of an operating environment 100 for various embodiments presented herein will be described. The illustrated operating environment 100 includes a computing device 102 that is configured to execute a cloud computing service ("CCS") application 104 to access, via a mobile wireless network 106, an internet 108 (e.g., the Internet) via which one or more cloud computing service resources ("CCSRs") 110 are provided by one or more cloud computing service providers (not shown). The computing device 102 may be a desktop computer, a laptop computer, a tablet computer, an ultraportable computer, a personal digital assistant ("PDA"), a smartphone, a video game console, a consumer electronics device, or any other type of computing device configured to perform various operations, actions, and/or functions described herein as being performed by the computing device 102. The CCS application 104 may be any application configured to be stored in a memory of the computing device 102 and to be executed by a processor of the computing device 102 to perform operations including accessing the CCSRs 110 via a unique uniform resource locator ("URL"). The unique URL, as will be described in greater detail below, may be known to a data subsidization system 112 operating within (as in the illustrated embodiment) or in communication with the mobile wireless network 106. The data subsidization system 112 may monitor data traffic directed to and/or from the computing device 102 in association with data communications with any number of unique URLs directed to any number of the CCSRs 110, and may perform operations towards subsidizing data charges associated with such data usage.

The mobile wireless network 106 may utilize any mobile wireless data communications technology to facilitate data communications with the CCSRs 110 via the internet 108. In some embodiments, the mobile wireless network 106 is configured to utilize General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), Long-Term Evolution ("LTE"), and/or other wireless data access standards to facilitate data communications with the CCSRs 110 via the internet 108. The mobile wireless network 106 may additionally provide mobile wireless voice service. For instance, the mobile wireless network 106 may utilize a mobile wireless telecommunications technology such as, but not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the mobile wireless network 106 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), or the like.

The CCSRs 110 may include servers, databases, networks, applications, and/or other computing resources that are utilized by one or more cloud computing service providers to provide a cloud computing service. A cloud computing service is defined herein as a service provided in accordance with a cloud computing model that enables ubiquitous, convenient, on-demand network access to a shared pool of configurable computing resources that can be rapidly provisioned and released with minimal management effort or service provider interaction. A cloud infrastructure is defined herein as the collection of hardware and software that enables a cloud computing service. It should be understood that although the CCS application 104 is described as being configured to access one or more of the CCSRs 110, the CCS application 104 alternatively may be a Web browser that is configured to access a Website or other computing resource made available via the internet 108. As such, the concepts and technologies disclosed herein may be directed to subsidizing data utilized to access any computing resource via the mobile wireless network 106 including, but not limited to, one or more of the CCSRSs 110 and/or one or more other computing resources (not shown) via the internet 108 or some other internet protocol ("IP") network.

In some embodiments, one or more of the CCSRs 110 is configured to provide Software as a Service ("SaaS"). SaaS is defined herein as the capability provided to the user to use the provider's application operating on a cloud infrastructure. The applications are accessed by the user via various client devices, such as the computing device 102, through either a thin client interface, such as a Web browser, or a program interface, which may be included in the CCS application 104. The user does not manage or control the underlying cloud infrastructure including networks, servers, operating systems, storage, or individual application capabilities, with the possible exception of user-specific application configuration settings.

In some embodiments, one or more of the CCSRs 110 is configured to provide a Platform as a Service ("PaaS"). PaaS is defined herein as the capability provided to the user to deploy onto a cloud infrastructure user-created or acquired applications created using programming languages, libraries, services, and/or tools supported by the provider. The user does not manage or control the underlying cloud infrastructure including networks, servers, operating systems, storage, but has control over the deployed applications and possibly configuration settings for the application-hosting environment.

In some embodiments, one or more of the CCSRs 110 is configured to provide Infrastructure as a Service ("IaaS"). IaaS is defined herein as the capability provided to the user to provision processing, storage, networks, and other computing resources where the user is able to deploy and run arbitrary software, which can include operating systems and applications. The user does not manage or control the underlying cloud infrastructure, but has control over operating systems, storage, and deployed applications; and possibly limited control of select networking components (e.g., host firewalls).

In some embodiments, one or more of the CCSRs 110 is provided as part of a private cloud infrastructure. A private cloud infrastructure is defined herein as a cloud infrastructure that is provisioned for exclusive use by a single organization including multiple users. A private cloud infrastructure may be owned, managed, and operated by the organization, a third party, or some combination thereof. A private cloud infrastructure may exist on or off premises.

In some embodiments, one or more of the CCSRs 110 is provided as part of a community cloud infrastructure. A community cloud infrastructure is defined herein as a cloud infrastructure that is provisioned for exclusive use by a specific community of users from organizations that have shared concerns (e.g., mission, security requirements, policy, and compliance considerations). A community cloud infrastructure may be owned, managed, and operated by one or more organizations in the community, a third party, or some combination thereof. A community cloud infrastructure may exist on or off premises.

In some embodiments, one or more of the CCSRs 110 is provided as part of a public cloud infrastructure. A public cloud infrastructure is defined herein as a cloud infrastructure that is provisioned for open use by the general public. A public cloud infrastructure may be owned, managed, and operated by a business, academic, or government organization, or some combination thereof. A public cloud infrastructure exists on the premises of the cloud service provider.

In some embodiments, one or more of the CCSRs 110 is provided as part of a hybrid cloud infrastructure. A hybrid cloud infrastructure is defined herein as a cloud infrastructure that is a composition of two or more distinct cloud infrastructures—private, community, or public—that remain unique entities, but are bound together by standardized or proprietary technology that enables data and application portability.

The illustrated mobile wireless network 106 includes the data subsidization system 112. In some embodiments, the data subsidization system 112 is configured to provision a cloud computing service for a data subsidization feature in accordance with a data subsidization scheme agreed upon between a mobile wireless service provider that owns and/or operates the mobile wireless network 106 and a cloud computing service provider that provides a cloud computing service. For instance, a cloud computing service provider that owns and/or operates one or more of the CCSRs 110 may establish an agreement with the mobile wireless service provider that owns and/or operates the mobile wireless network 106 to subsidize at least a portion of the data usage associated with the transfer of data between the computing device 102 and the CCSRs 110 during the course of using the cloud computing service provider's service. In this manner, the mobile wireless service provider can provide data to a customer associated with the computing device 102 for free or for a fraction of the cost typically associated with providing the data. In some embodiments, the cloud service provider may establish an agreement with only the mobile wireless service provider that owns and/or operates the mobile wireless network 106. In some other embodiments, the cloud service provider may establish an agreement with multiple mobile wireless service providers. Likewise, the mobile wireless service provider may establish an agreement with multiple cloud computing service providers and/or providers of other computing resources accessible by the computing device 102 via the mobile wireless network 106.

In some embodiments, the data subsidization system 112 is configured to execute a number of program modules in order to perform various operations, actions, and functions described herein. In the illustrated embodiment, the data subsidization system 112 is configured to execute a data usage meter module 114 and a charging and a billing interface module 116 to perform various operations, actions, and/or functions described herein. These modules may execute on a single data subsidization system 112, as in the illustrated embodiment, or in parallel across multiple data subsidization systems (not shown). In addition, each module may consist of a number of subcomponents executing on data subsidization systems or other computing systems or devices within, or in communication with, the data subsidization system 112. The data usage meter module 114 and the charging and billing interface module 116 may be combined. The modules may be implemented as software, hardware, or any combination thereof.

The data usage meter module 114 is configured to monitor data traffic for data traffic that is directed to one or more unique URLs. The data usage meter module 114 is also configured to record data usage for data traffic directed to the one or more unique URLs.

The charging interface module 116 is configured to provide the recorded data usage to a charging system 118 with instructions to perform additional operations towards the subsidization of at least a portion of the cost associated with the recorded data usage in accordance with an agreement, if applicable, between the mobile wireless service provider and the cloud computing service provider associated with the unique URL.

In some embodiments, the data subsidization system 112 provides gateway functionality between the mobile wireless network 106 and the internet 108. In some embodiments, the data subsidization system 112 provides gateway functionality between the mobile wireless network 106 and one or more other IP networks, which may or may not be owned and/or operated by the mobile wireless service provider that provides the mobile wireless network 106.

In some embodiments, the data subsidization system 112 provides protocol conversion functionality to convert one or more protocols utilized by the mobile wireless network 106 to one or more protocols utilized by the internet 108 and/or one or more other IP networks.

The charging system 118 is configured to perform online and/or offline charging of one or more customer accounts stored in a customer account database 120. The charging system 118 may be deployed to provide charging rule functions for prepaid and/or postpaid network platforms. Although a single charging system 118 is illustrated, separate charging systems for prepaid and/or postpaid network platforms may be implemented. The charging system 118 is also configured to receive instructions from the data subsidization system 112 in regard to the data usage to be subsidized and to charge the appropriate customer account in accordance therewith.

The illustrated mobile wireless network 106 also includes a billing system 122. The billing system 122 is configured to generate bills for customers based upon information retrieved from the customer account database 120. In some embodiments, the billing system 122 is configured to handle payments. In some embodiments, the billing system 122 is configured to provide bills to one or more external systems that provide the bills to customers via email, physical mail, text message, and/or an online account. In some embodiments, one or more external system are configured to handle payments in addition to or as an alternative to the payments being handled by the billing system 122.

Figure 2:
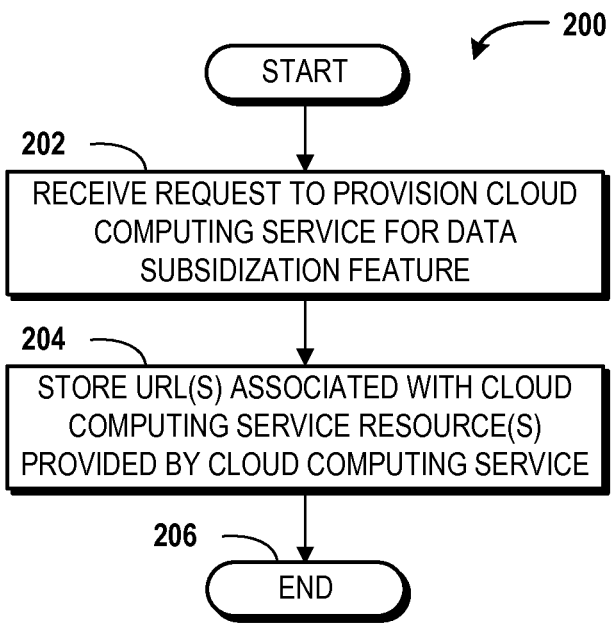
FIG. 2 is a flow diagram showing aspects of a method for provisioning a cloud computing service for a data subsidization feature, according to an illustrative embodiment.

Turning now to FIG. 2, a flow diagram showing aspects of a method 200 for provisioning a cloud computing service for a data subsidization feature will be described, according to an illustrative embodiment. It should be understood that the operations, functions, or actions illustrated by one or more blocks in the methods disclosed herein are not necessarily presented in any particular order and that performance of some or all of the operations, functions, or actions in an alternative order(s) is possible and is contemplated. The operations, functions, or actions have been presented in the demonstrated order for ease of description and illustration. Operations, functions, or actions may be combined, separated, added, omitted, modified, and/or performed simultaneously or in another order, without departing from the scope of the subject disclosure.

It also should be understood that the illustrated methods can be ended at any time and need not be performed in their respective entireties. Some or all operations, functions, or actions of the methods, and/or substantially equivalent operations, functions, or actions, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single processor or multi-processor systems, wireless devices, mobile devices, minicomputers, mainframe computers, personal computers, hand-held computing devices, processor-based, programmable consumer electronics, combinations thereof, and the like.

Thus, it should be appreciated that the logical operations, functions, or actions described herein may be implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations, functions, or actions described herein are referred to variously as states, operations, structural devices, acts, or modules. These operations, structural devices, acts, and modules may be implemented in software, in firmware, in special purpose digital logic, and any combination thereof.

The method 200 begins and proceeds to block 202, wherein the data subsidization system 112 receives a request to provision a cloud computing service for a data subsidization feature. In some embodiments, the request is prompted by the mobile wireless service provider that owns and/or operates the mobile wireless network 106. In some other embodiments, the request is unprompted. In some embodiments, the request is received by the data subsidization system 112 from a computing system that is owned and/or operated by a cloud computing service provider that offers the cloud computing service for which the data subsidization feature is requested. In some other embodiments, the request is received by the data subsidization system 112 from a computing system associated with the mobile wireless service provider. In either case, the request may include details regarding an agreement reached between the mobile wireless service provider or may include reference to such details. The agreement details may be utilized by the data subsidization system 112 to provision the cloud computing service for the data subsidization feature in accordance with conditions such as, but not limited to, the amount of data to be subsidized and/or the monetary value of the data to be subsidized identified in the agreement. For instance, an agreement between the mobile wireless service provider and the cloud computing service provider may be to add a monetary value to the customer's account for data usage associated with data traffic to and/or from one or more of the CCSRs 110 that are used at least in part to provide the cloud computing service. Alternatively, the agreement may be for the cloud computing service provider to pay a sum of money to the mobile wireless service provider in exchange for data credit, which may be distributed by the cloud computing service provider to customers in a manner suitable for the business goals of the cloud computing service provider, such as by way of discount code, coupon, or other promotion.

The request includes one or more unique URLs associated with one or more of the CCSRs 110 provided by the cloud computing service. At block 204, the data subsidization system 112 stores the unique URL(s). From block 204, the method 200 proceeds to block 206, wherein the method 200 ends.

Figure 3:
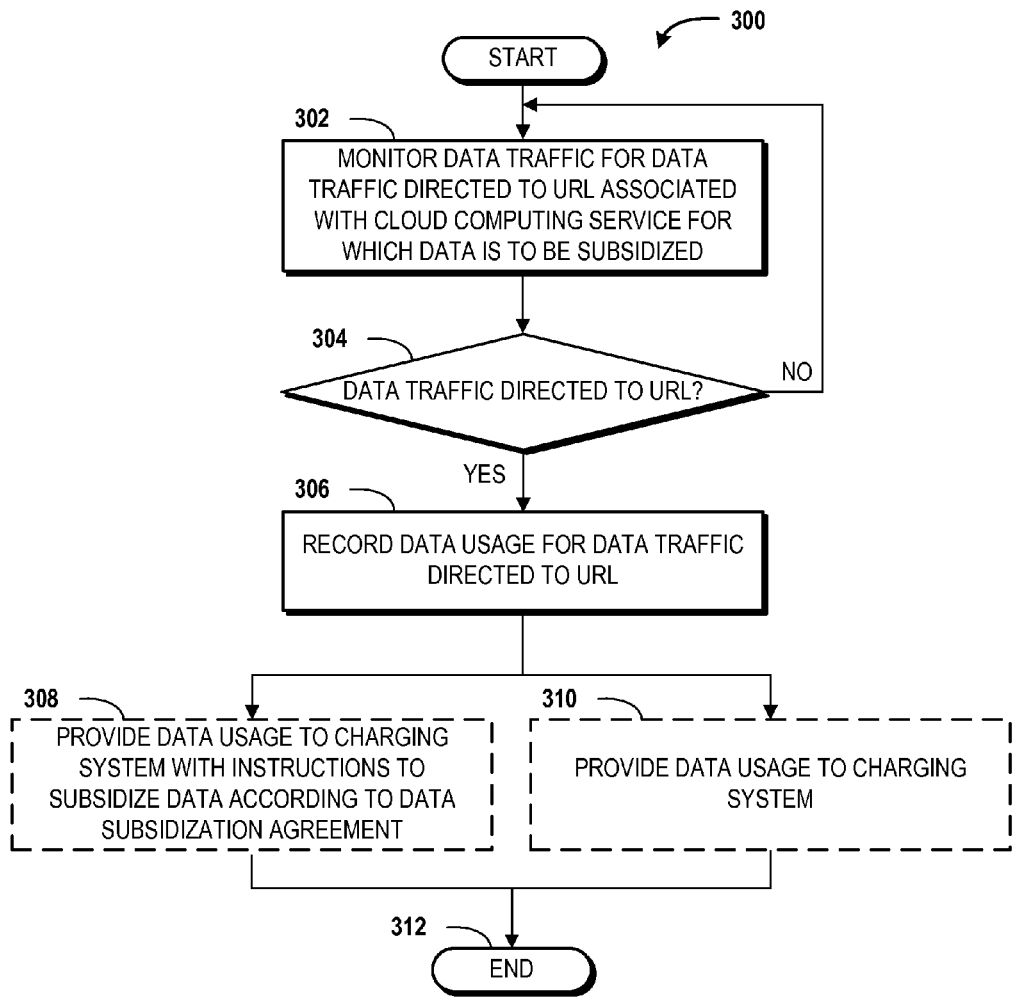
FIG. 3 is a flow diagram showing aspects of a method for monitoring data traffic for data usage that is to be subsidized, according to an illustrative embodiment.

Turning now to FIG. 3, a method 300 for monitoring data traffic for data usage that is to be subsidized will be described, according to an illustrative embodiment. The method 300 begins and proceeds to block 302, wherein the data subsidization system 112 monitors data traffic traversing the mobile wireless network 106 for data traffic that is directed to a URL associated with a cloud computing service for which data is to be subsidized. In some embodiments, the data subsidization system 112 monitors content contained within the data traffic. In some other embodiments, the data subsidization system 112 monitors header data for data packets contained within the data traffic. In some embodiments, the data subsidization system 112 monitors content and header information contained within the data traffic.

From block 302, the method 300 proceeds to block 304, wherein the data subsidization system 112 determines if the data traffic is directed to a URL associated with a cloud computing service for which data is to be subsidized. If the data subsidization system 112 determines that the data traffic is not directed to a URL associated with a cloud computing service for which data is to be subsidized, the data subsidization system 112 continues to monitor the data traffic at block 302. If, however, the data subsidization system 112 determines that the data traffic is directed to a URL associated with a cloud computing service for which data is to be subsidized, the method 300 proceeds to block 306. At block 306, the data subsidization system 112 records data usage for the data traffic that is directed to the URL. In some embodiments, the data subsidization system 112 records the data usage in data blocks, which may contain some arbitrary amount of data. In some other embodiments, the data subsidization system 112 records the data usage in bytes or some multiple thereof such as, but not limited to, megabytes or gigabytes.

From block 306, the method 300 may proceed to block 308 or to block 310 depending upon the agreement between the cloud computing service provider and the mobile wireless service provider. At block 308, the data subsidization system 112 provides the data usage recorded at block 306 to the charging system 118 with instructions to subsidize data according to a data subsidization agreement between the cloud computing service provider and the mobile wireless service provider. In some embodiments, the data subsidization system 112 provides the details of the agreement as part of the instructions. In some other embodiments, the charging system 118 obtains the details of the agreement, for example, from the customer account database 120 or some other database, server, or other system within or in communication with the mobile wireless network 106. The details of the agreement may be particular to a customer associated with the data traffic or a group of customers that includes up to all of the customers that have a customer account with the mobile wireless service provider. From block 308, the method 300 proceeds to block 312, wherein the method 300 ends. At block 310, the data subsidization system 112 alternatively provides the data usage recorded at block 306 to the charging system 118, but without instructions to subsidize the data. From block 308, the method 300 proceeds to block 312, wherein the method 300 ends.

Figure 4:
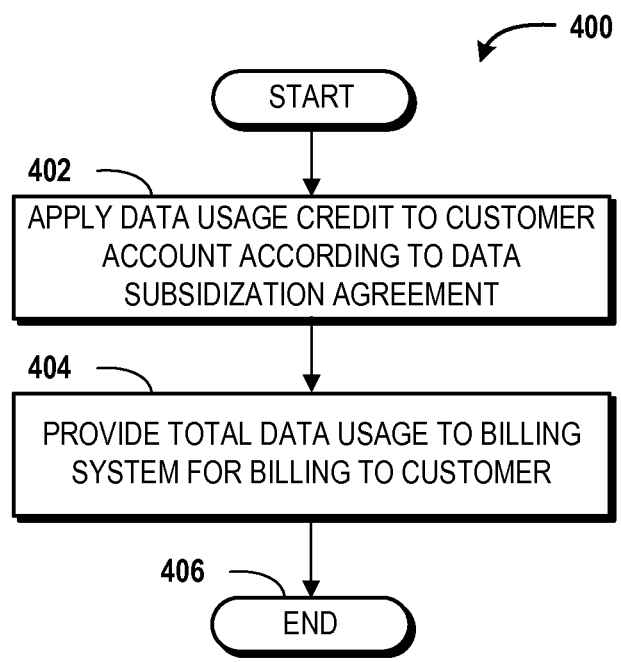
FIG. 4 is a flow diagram showing aspects of a method for applying a data usage credit to a customer account, according to an illustrative embodiment.

Turning now to FIG. 4, a method 400 for applying a data usage credit to a customer account will be described, according to an illustrative embodiment. As explained above with respect to FIG. 3, the data subsidization system 112 may provide data usage for traffic directed to a unique URL to the charging system 118 with instructions to subsidize the data according to a data subsidization agreement. The method 400 is an illustrative method illustrating what operations, functions, and/or actions the charging system 118 may perform in response to the data subsidization system 112 performing the operations, functions, and/or actions described at block 308 of the method 300 described above.

The method 400 begins and proceeds to block 402, wherein the charging system 118 applies a data usage credit to the customer account according to the data subsidization agreement. From block 402, the method 400 proceeds to block 404, wherein the charging system 118 provides a total data usage that reflects the applied data usage credit to the billing system 122 so that the billing system 122 can bill the customer. From block 404, the method 400 proceeds to block 406, wherein the method 400 ends.

Figure 5:
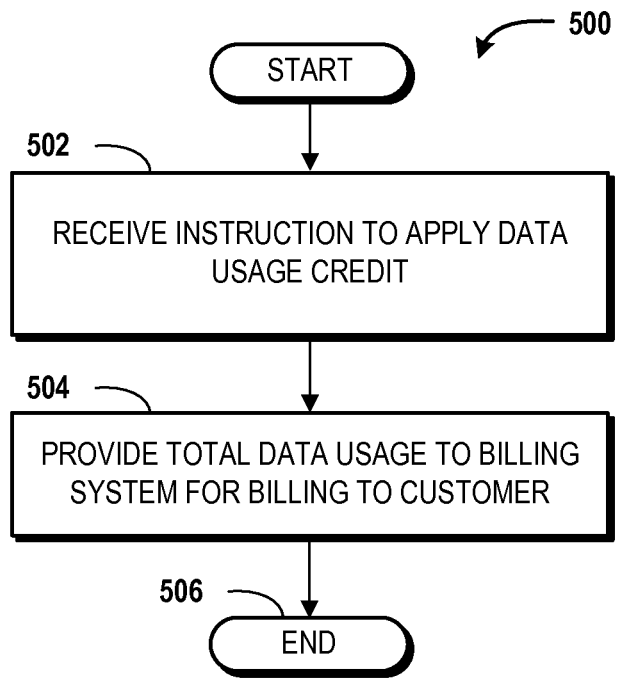
FIG. 5 is a flow diagram showing aspects of another method for applying a data usage credit to a customer account, according to an illustrative embodiment.

Turning now to FIG. 5, a method 500 for applying a data usage credit to a customer account will be described, according to an illustrative embodiment. As explained above with respect to FIG. 3, the data subsidization system 112 may provide data usage for traffic directed to a unique URL to the charging system 118 without instructions to subsidize the data. The method 500 is an illustrative method illustrating what operations, functions, and/or actions the charging system 118 may perform in response to the data subsidization system 112 performing the operations, functions, and/or action described at block 310 of the method 300 described above.

The method 500 begins and proceeds to block 502, wherein the charging system 118 receives an instruction to apply a data usage credit. In some embodiments, the instruction originates from a Web page through which a customer can enter a discount code, scan a coupon, or otherwise provide information that is associated with the application of the data usage credit to the customer account for which the discount code, coupon, or other information is provided.

From block 502, the method 500 proceeds to block 504, wherein the charging system 118 provides a total data usage that reflects the applied data usage credit to the billing system 122 so that the billing system 122 can bill the customer. From block 504, the method 500 proceeds to block 506, wherein the method 500 ends.

Figure 6:
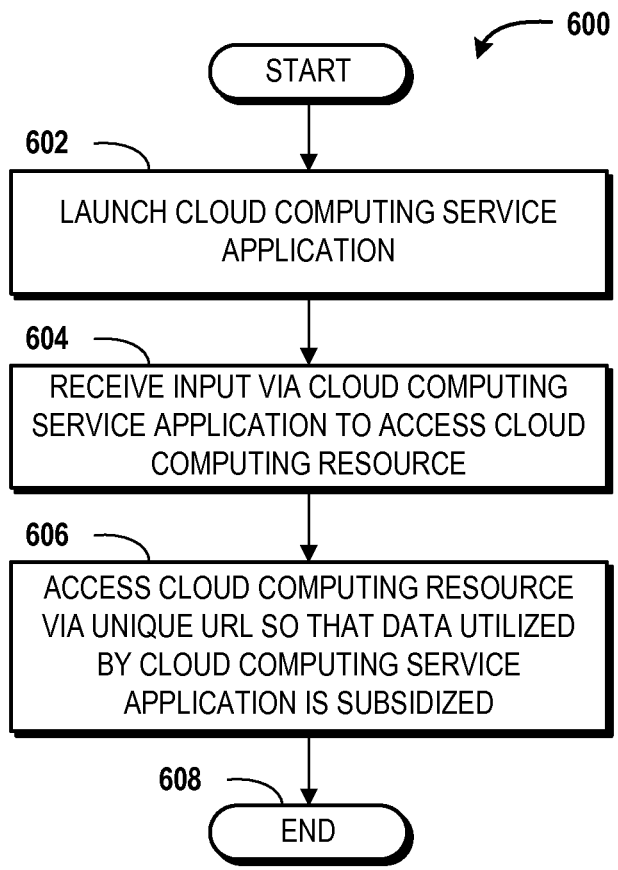
FIG. 6 is a flow diagram showing aspects of a method for accessing a cloud computing resource associated with a cloud computing service that offers subsidized data, according to an illustrative embodiment.

Turning now to FIG. 6, a method 600 for accessing a CCSR associated with a cloud computing service that offers subsidized data will be described, according to an illustrative embodiment. The method 600 begins and proceeds to block 602, wherein the computing device 102 launches the CCS application 104. In some embodiments, the computing device 102 launches the CCS application 104 in response to a user input. The user input may include, but is not limited to, a button input, a touchscreen input, a multi-touch gesture input, a voice input, or a user-initiated scan of a single or multi-dimensional barcode or other scannable instruction. In some other embodiments, the computing device 102 launches the CCS application 104 in response to an external trigger that launches the CCS application 104 without physical contact with the computing device 102. The external trigger may include, but is not limited to: an instruction to launch the CCS application 104 received from the mobile wireless network 106, a WIFI network, a personal area network, or any other network; a near-field communications device; or a scan of a single or multi-dimensional barcode or other scannable instruction that is initiated automatically or otherwise not by a user. In some other embodiments, the CCS application 104 is launched in response to the computing device 102 being directed to a Web page.

From block 602, the method 600 proceeds to block 604, wherein the computing device 102 receives an input via the CCS application 104 to access one or more of the CCSRs 110 that are associated with the CCS application 104. The input may be a user input or an external trigger such as described above but for accessing one or more of the CCSRs 110 instead of launching the CCS application 104. In some embodiments, a single input—user-initiated or external trigger—causes the computing device 102 to launch the CCS application 104 and to request access to one or more of the CCSRs 110 that is associated with the CCS application 104.

From block 604, the method 600 proceeds to block 606, wherein computing device 102 accesses the CCSR(s) 110 via the unique URL so that data utilized by the CCS application 104 is subsidized. The method 600 then proceeds to block 608, wherein the method 600 ends.

Figure 7:
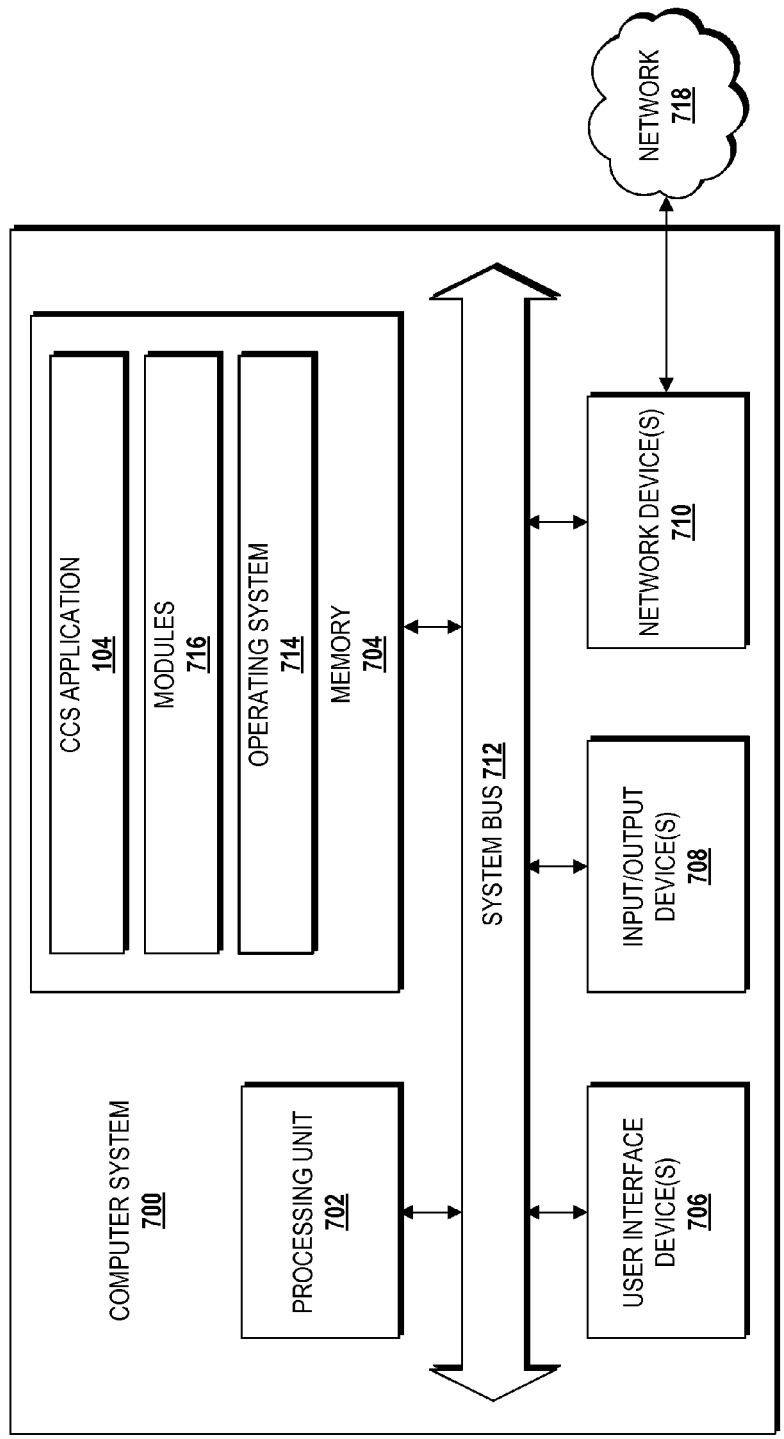
FIG. 7 is a computer architecture diagram illustrating an illustrative computer hardware and software architecture for a computing system capable of implementing aspects of the embodiments presented herein.

FIG. 7 is a block diagram illustrating a computer architecture 700 configured to perform various operations disclosed herein for subsidizing data usage in a mobile wireless network. Thus, the computer architecture 700 illustrated in FIG. 7 illustrates an architecture for a personal computer, a desktop workstation, a laptop computer, a tablet computer, a notebook computer, an ultraportable computer, a PDA, an electronic-book reader, a smartphone, a game console, a set-top box, a consumer electronics device, a server computer, or any other type of computing device configured to perform the various operations described herein for subsidizing data usage in a mobile wireless network. The computer architecture 700 may be utilized to execute any aspects of the software components presented herein.

In some embodiments, the data subsidization system 112 is configured in accordance with the computer architecture 700. In some embodiments, the computing device 102 is configured in accordance with the computer architecture 700. As such, software components of the data subsidization system 112 and the computing devices 102 are shown together within the computer architecture 700 for ease of illustration. It should be understood, however, that these software components may be and are likely to be implemented in separate systems as in the embodiment illustrated in FIG. 1.

The computer architecture 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the computer architecture 700. Processing units are generally known, and therefore are not described in further detail herein.

The memory 704 communicates with the processing unit 702 via the system bus 712. In some embodiments, the memory 704 is operatively connected to a memory controller (not shown) that enables communication with the processing unit 702 via the system bus 712. The illustrated memory 704 includes an operating system 714, modules 716, and the CCS application 104. The modules 716 include modules executed by the data subsidization system 112 described herein above to perform the operations, functions, and/or actions described herein. In particular, the modules 716 may include the data usage meter module 114 and/or the charging system interface module 116.

The operating system 714 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 706 may include one or more devices with which a user accesses the computer architecture 700. The user interface devices 706 may include, but are not limited to, computers, servers, personal digital assistants, telephones (e.g., cellular, IP, or landline), or any suitable computing devices. The I/O devices 708 enable a user to interface with the program modules. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer architecture 700 to communicate with other networks or remote systems via a network 718. Examples of the network devices 710 include, but are not limited to, a modem, a radio frequency ("RF") or infrared ("IR") transceiver, a telephonic interface, a bridge, a router, or a network card. The network 718 may include a wireless network such as, but not limited to, a WLAN such as a WI-FI network, a WWAN, a wireless personal area network ("WPAN") such as BLUETOOTH, or a wireless metropolitan area network ("WMAN"). Alternatively, the network 718 may be a wired network such as, but not limited to, a wide area network ("WAN") such as the Internet or the internet 108, a LAN, a wired personal area network ("PAN"), or a wired metropolitan area network ("MAN").

The network 718 embodied as a cellular network may utilize a mobile telecommunications technology such as, but not limited to, GSM, CDMA ONE, CDMA2000, UMTS, LTE, and WiMAX. Moreover, the network 718 may utilize various channel access methods (which may or may not be used by the aforementioned standards) including, but not limited to, TDMA, FDMA, CDMA, W-CDMA, OFDM, SDMA, and the like. Data communications may be provided using GPRS, EDGE, the HSPA protocol family including HSDPA, EUL or otherwise termed HSUPA, HSPA+, LTE, and various other current and future wireless data access standards. The network 718 may be the wireless mobile network 106.

As used herein, communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the architecture 700. For purposes of the claims, the phrase "computer storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

Figure 8:
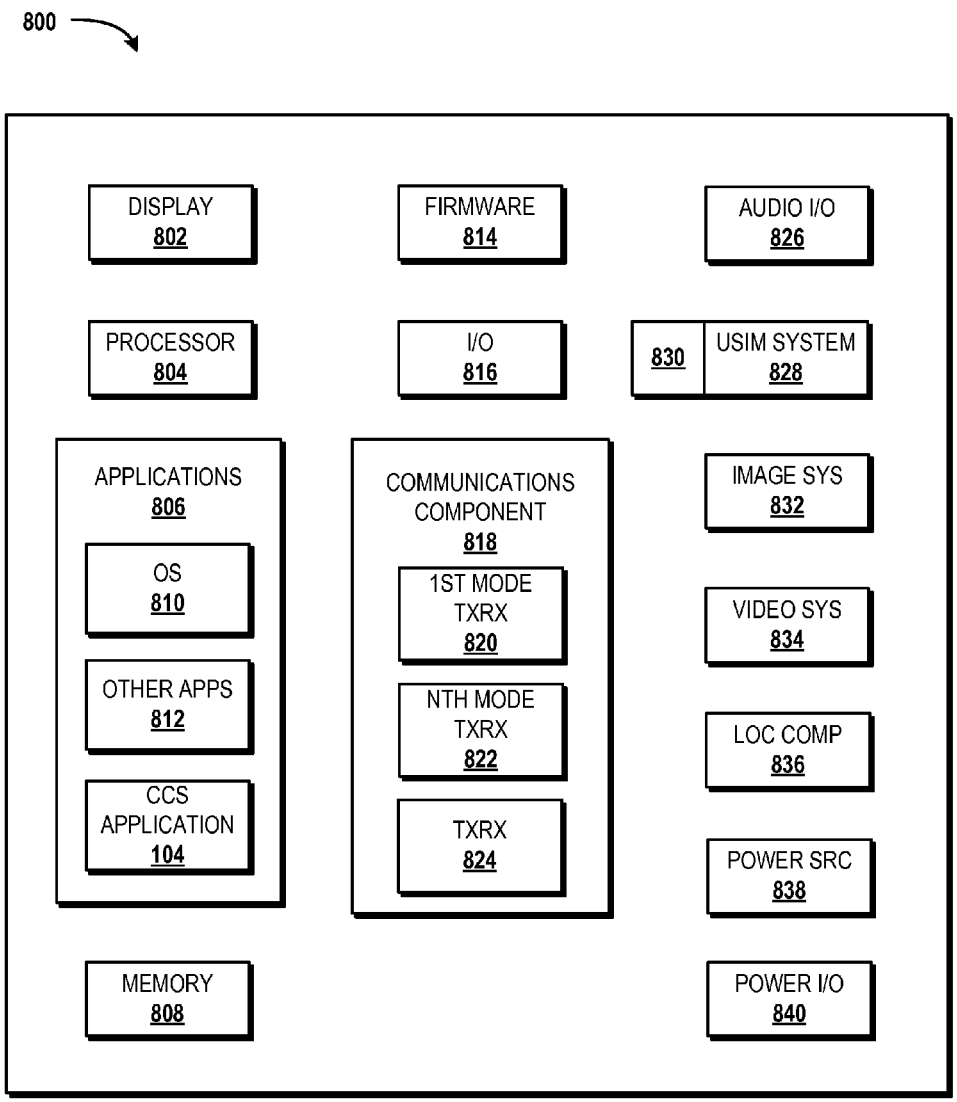
FIG. 8 is a mobile device architecture diagram illustrating an illustrative mobile device hardware and software architecture for a mobile device capable of implementing aspects of the embodiments disclosed herein.

Turning now to FIG. 8, an illustrative mobile device 800 and components thereof will be described. Although connections are not shown between the components illustrated in FIG. 8, the components can interact with each other to carry out device functions. In some embodiments, for example, the components are arranged so as to communicate via one or more busses (not shown). It should be understood that FIG. 8 and the following description are intended to provide a general understanding of a suitable environment in which various aspects of embodiments can be implemented. The computing device 102 described herein above may be configured like the mobile device 800. It should be understood that the mobile device may include additional functionality or include less functionality than now described.

As illustrated in FIG. 8, the mobile device 800 includes a display 802 for visually displaying data including, but not limited to, graphical user interface ("GUI") elements, text, images, video, virtual keypads and/or keyboards, messaging data, notification messages, metadata, internet content, device status, time, date, calendar data, device preferences, map and location data, and the like. The mobile device 800 also includes a processor 804 for processing data and/or executing computer-readable instructions of one or more applications 806 stored in a memory 808.

In the illustrated embodiment, the applications 806 include an operating system ("OS") application 810, other applications 812, and the CCS application 104. In some embodiments, the OS application 810 is one of SYMBIAN OS from SYMBIAN LIMITED, WINDOWS MOBILE OS from MICROSOFT CORPORATION, WINDOWS PHONE OS from MICROSOFT CORPORATION, PALM WEBOS from HEWLETT PACKARD CORPORATION, BLACKBERRY OS from RESEARCH IN MOTION LIMITED, IOS from APPLE INC., and ANDROID OS from GOOGLE INC. These operating systems are merely illustrative of the operating systems that may be used in accordance with the embodiments disclosed herein.

In some embodiments, the other applications 812 include, for example, Web browser applications, messaging applications, text-to-speech and speech-to-text applications, add-ons, plug-ins, e-mail applications, music applications, video applications, camera applications, location-based service applications, navigation applications, power conservation applications, game applications, productivity applications, entertainment applications, enterprise applications, combinations thereof, and the like.

The applications 806 or portions thereof are stored in the memory 808 and/or in a firmware 814, and are executed by the processor 804. The firmware 814 may also store code for execution during device power up and power down operations. In some embodiments, the OS 810 or a portion thereof, such as a kernel, is stored in the firmware 814.

The mobile device 800 also includes an input/output ("I/O") interface 816 for the input/output of data such as location information, presence status information, user IDs, passwords, application initiation (start-up) requests, and other input/output of data associated with the embodiments disclosed herein. In some embodiments, the I/O interface 816 is a hardwire connection such as a universal serial bus ("USB"), mini-USB, micro-USB, audio jack, PS2, IEEE 1394, serial, parallel, Ethernet (RJ411) port, RJ11 port, proprietary port, combinations thereof, or the like. In some embodiments, the mobile device 800 is configured to synchronize with another device (e.g., a computer) to transfer content stored to/from the mobile device 800. In some embodiments, the mobile device 800 is configured to receive updates to one or more of the applications 806 via the I/O interface 816. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device instead of, or in addition to, a communications component 818.

The communications component 818 interfaces with the processor 804 to facilitate wireless communications with one or more networks, such as the mobile wireless network 106. In some embodiments, the one or more networks include networks that utilize a mobile wireless technology. In some embodiments, one or more networks include networks that utilize non-cellular wireless technologies such as WI-FI or WIMAX. In some embodiments, the communications component 818 includes a multimode communications subsystem for facilitating communications via a cellular network and one or more WI-FI, WIMAX or other non-cellular wireless network.

The communications component 818, in some embodiments, includes one or more transceivers each configured to communicate over the same or a different wireless technology standard. For example, the transceivers of the communications component 818 may be configured to communicate using GSM, CDMAONE, CDMA2000, LTE, and various other 2G, 3G, 4G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like. In addition, the communications component 818 may facilitate data communications using GPRS, EDGE, the HSPA protocol family including HSDPA, EUL or otherwise termed HSUPA, HSPA+, and various other current and future wireless data access standards.

In the illustrated embodiment, the communications component 818 includes a first cellular transceiver 820 that operates in one mode (e.g., GSM), and an $N^{th}$ cellular transceiver 822 operates in a different mode (e.g., UMTS). While only two cellular transceivers 820, 822 are illustrated, it should be appreciated that more than two transceivers can be included in the communications component 818.

The illustrated communications component 818 also includes an alternative communications transceiver 824 for use by other communications technologies including WI-FI, WIMAX, BLUETOOTH, infrared, IRDA, NFC, other RF, combinations thereof, and the like. In some embodiments, the communications component 818 also facilitates reception from terrestrial radio networks, digital satellite radio networks, internet-based radio service networks, combinations thereof, and the like.

In some embodiments, the communications component 818 processes data from a network such as an internet, the Internet, an intranet, a home broadband network, a WI-FI hotspot, and the like, via an internet service provider ("ISP"), digital subscriber line ("DSL") provider, or broadband provider.

Audio capabilities for the mobile device 800 may be provided by an audio I/O component 826 that includes a speaker for the output of audio signals and a microphone to collect audio signals.

The illustrated mobile device 800 also includes a universal subscriber identity module ("USIM") system 828 that includes a SIM slot interface 830 for accommodating a USIM card. In some embodiments, the USIM system 828 is configured to accept insertion of other SIM cards for access to other network types such as GSM. In other embodiments, the USIM system 828 is configured to accept multiple SIM cards. In still other embodiments, the USIM system 828 is configured to accept a universal integrated circuit card ("UICC") with one or more SIM applications stored thereupon.

The mobile device 800 may also include an image capture and processing system 832 ("image system"). Photos may be obtained via an associated image capture subsystem of the image system 832, for example, a camera. The mobile device 800 may also include a video system 834 for capturing, processing, recording, and/or modifying video content. Photos and videos obtained using the image system 832 and the video system 834, respectively, may be added as message content to a MMS message and sent to another mobile device.

The illustrated mobile device 800 also includes a location component 836 for sending and/or receiving signals such as global positioning system ("GPS") data, assisted-GPS data, WI-FI/WIMAX and/or cellular network triangulation data, combinations thereof, and the like, for determining a location of the mobile device 800. The location component 836 may communicate with the communications component 818 to retrieve triangulation data for determining a location of the mobile device 800. In some embodiments, the location component 836 interfaces with cellular network nodes, telephone lines, satellites, location transmitters and/or beacons, wireless network transmitters and receivers, combinations thereof, and the like. In some embodiments, the location component 836 includes one or more sensors such as a compass, an accelerometer, and/or a gyroscope to determine the orientation of the mobile device 800. Using the location component 836, the mobile device 800 can generate and/or receive data to identify its location, or transmit data used by other devices to determine the location of the mobile device 800. The location component 836 may include multiple components for determining the location and/or orientation of the mobile device 800.

The illustrated mobile device 800 also includes a power source 838, such as one or more batteries and/or other power subsystem (AC or DC). The power source 838 may interface with an external power system or charging equipment via a power I/O component 840.

Based on the foregoing, it should be appreciated that technologies for subsidizing data usage in a mobile wireless network have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

I claim:

1. A method for subsidizing data usage, the method comprising:
    monitoring, at a data subsidization system comprising a processor, data traffic traversing a mobile wireless network;
    determining, at the data subsidization system, if the data traffic is directed to a unique uniform resource locator associated with a computing resource that data directed thereto is to be subsidized; and
    in response to determining that the data traffic is directed to the unique uniform resource locator,
        recording, at the data subsidization system, data usage for the data traffic, and
        providing, at the data subsidization system, the data usage to a charging system of the mobile wireless network, wherein the charging system applies a data usage credit to a customer account associated with the data usage in accordance with an instruction generated based upon a discount code indicating an amount for the data usage credit.

2. The method of claim 1, wherein the amount comprises a monetary amount to be applied towards the customer account to subsidize at least a portion of the data usage.

3. The method of claim 2, further comprising providing, at the charging system, a total data usage reflecting the data usage credit to a billing system.

4. The method of claim 1, further comprising receiving, at the data subsidization system, a request to provision a cloud computing service that utilizes the computing resource for a data subsidization feature to subsidize data directed to the unique uniform resource locator.

5. The method of claim 4, further comprising storing, at the data subsidization system, the unique uniform resource locator.

6. The method of claim 1, wherein at least a portion of the data traffic is received from a computing device configured to execute an application comprising the unique uniform resource locator to access the computing resource.

7. The method of claim 1, wherein the amount comprises a data block amount to be applied towards the customer account to subsidize at least a portion of the data usage.

8. The method of claim 1, wherein the instruction generated based upon the discount code originates from a Web page through which a customer entered the discount code.

9. A computer-readable storage medium having computer-readable instructions stored thereupon that, when executed by a computer, cause the computer to perform operations, comprising:
- monitoring data traffic traversing a mobile wireless network;
- determining if the data traffic is directed to a unique uniform resource locator associated with a computing resource that data directed thereto is to be subsidized; and
- in response to determining that the data traffic is directed to the unique uniform resource locator, recording data usage for the data traffic and providing the data usage to a charging system of the mobile wireless network, wherein the charging system applies a data usage credit to a customer account associated with the data usage in accordance with an instruction generated based upon a discount code indicating an amount for the data usage credit.

10. The computer-readable storage medium of claim 9, wherein the amount comprises a monetary amount to be applied towards the customer account to subsidize at least a portion of the data usage.

11. The computer-readable storage medium of claim 9, wherein the amount comprises a data block amount to be applied towards the customer account to subsidize at least a portion of the data usage.

12. The computer-readable storage medium of claim 9, wherein the instruction generated based upon the discount code originates from a Web page through which a customer entered the discount code.

13. A computer system, comprising:
- a processor; and
- a memory in communication with the processor, the memory having processor-executable instructions stored thereupon that, when executed by the processor, cause the processor to perform operations comprising
  - monitoring data traffic traversing a mobile wireless network,
  - determining if the data traffic is directed to a unique uniform resource locator associated with a computing resource that data directed thereto is to be subsidized, and
  - in response to determining that the data traffic is directed to the unique uniform resource locator, recording data usage for the data traffic and providing the data usage to a charging system of the mobile wireless network, wherein the charging system applies a data usage credit to a customer account associated with the data usage in accordance with an instruction generated based upon a discount code indicating an amount for the data usage credit.

14. The computer system of claim 13, wherein the memory further comprises instructions that, when executed by the processor, cause the processor perform a further operation comprising receiving a request to provision a cloud computing service that utilizes the computing resource for a data subsidization feature to subsidize data directed to the unique uniform resource locator.

15. The computer system of claim 14, wherein the memory further comprises instructions that, when executed by the processor, cause the processor perform a further operation comprising storing the unique uniform resource locator.

16. The computer system of claim 13, wherein the amount comprises a monetary amount to be applied towards the customer account to subsidize at least a portion of the data usage.

17. The computer system of claim 13, wherein the amount comprises a data block amount to be applied towards the customer account to subsidize at least a portion of the data usage.

18. The computer system of claim 13, wherein the instruction generated based upon the discount code originates from a Web page through which a customer entered the discount code.

* * * * *